(12) United States Patent
An et al.

(10) Patent No.: US 10,999,612 B2
(45) Date of Patent: May 4, 2021

(54) BROADCAST SIGNAL RECEPTION DEVICE AND BROADCAST SIGNAL RECEPTION METHOD

(71) Applicant: LG ELECTRONICS INC., Seoul (KR)

(72) Inventors: Seungjoo An, Seoul (KR); Hyekyeong Yeom, Seoul (KR); Jinwon Lee, Seoul (KR); Huisang Yoo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/494,131

(22) PCT Filed: Mar. 14, 2017

(86) PCT No.: PCT/KR2017/002766
§ 371 (c)(1),
(2) Date: Sep. 13, 2019

(87) PCT Pub. No.: WO2018/169101
PCT Pub. Date: Sep. 20, 2018

(65) Prior Publication Data
US 2020/0077125 A1 Mar. 5, 2020

(51) Int. Cl.
*H04N 21/2362* (2011.01)
*H04N 21/235* (2011.01)
*H04N 21/2381* (2011.01)
*H04N 21/434* (2011.01)

(52) U.S. Cl.
CPC ....... *H04N 21/2362* (2013.01); *H04N 21/235* (2013.01); *H04N 21/2381* (2013.01); *H04N 21/4345* (2013.01)

(58) Field of Classification Search
CPC ............ H04N 21/2362; H04N 21/235; H04N 21/2381; H04N 21/4345
See application file for complete search history.

(56) References Cited

U.S. PATENT DOCUMENTS

| | | |
|---|---|---|
| 2009/0265736 A1 | 10/2009 | Son |
| 2009/0288116 A1 | 11/2009 | Zalewski |
| 2014/0282699 A1 | 9/2014 | Fertig et al. |
| 2020/0296448 A1* | 9/2020 | Yang .................. H04N 21/4383 |

FOREIGN PATENT DOCUMENTS

| | | |
|---|---|---|
| KR | 100894550 B1 | 4/2009 |
| KR | 1020090103632 A | 10/2009 |
| KR | 1020120020915 A | 3/2012 |
| KR | 1020160116334 A | 10/2016 |

OTHER PUBLICATIONS

Advanced Television Systems Committee, "ATSC Candidate Standard: Signaling, Delivery, Synchronization, and Error Protection (A/331)", Doc S33-174r3, Jun. 21, 2016.

\* cited by examiner

*Primary Examiner* — Chandrahas B Patel
(74) *Attorney, Agent, or Firm* — Dentons US LLP

(57) ABSTRACT

A broadcast signal reception method is disclosed. According to an embodiment of the present invention, the broadcast signal reception method comprises the steps of: receiving a first broadcast signal through a first channel; parsing service list table (SLT) information included in the first broadcast signal; parsing service layer signaling (SLS) information received on the basis of the SLT; and providing a broadcast service on the basis of the SLS information.

18 Claims, 25 Drawing Sheets

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|         SLT | var | Sec. 6.3 |
|         break; | | |
|      case 0x02: | | |
|         RRT | var | See Annex F |
|         break; | | |
|      case 0x03: | | |
|         System Time | var | Sec. 6.4 |
|         break; | | |
|      case 0x04: | | |
|         CAP | var | Sec. 6.5 |
|         break; | | |
|      default: | | |
|         reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcCignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | Use | Data Type |
|---|---|---|
| bundleDescription | | |
|   userServiceDescription | | |
|     @globalServiceID | 1 | anyURL |
|     @serviceID | 1 | unsignedShort |
|     @serviceStatus | 0..1 | boolean |
|     @fullMPDUri | 1 | anyURL |
|     @sTSIDUri | 1 | anyURL |
|     name | 0..N | string |
|       @lang | 1 | language |
|     serviceLanguage | 0..N | language |
|     capabilityCode | 0..1 | string |
|     deliveryMethod | 1..N | |
|       broadcastAppService | 1..N | |
|         basePattern | 1..N | string |
|       unicastAppService | 0..N | |
|         basePattern | 1..N | string | t4010

| Element or Attribute Name | Use | Data Type |
|---|---|---|
| S-TSID | | |
|   @serviceID | 1 | unsignedShort |
|   RS | 1..N | |
|     @bsid | 0..1 | unsignedShort |
|     @sIpAddr | 0..1 | string |
|     @dIpAddr | 0..1 | string |
|     @dport | 0..1 | unsignedShort |
|     @PLPID | 0..1 | unsignedByte |
|     LS | 1..N | |
|       @tsi | 1 | unsignedInt |
|       @PLPID | 0..1 | unsignedByte |
|       @bw | 0..1 | unsignedInt |
|       @startTime | 0..1 | dateTime |
|       @endTime | 0..1 | dateTime |
|       SrcFlow | 0..1 | srcFlowType |
|       RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 8

| serviceCategory | Meaning |
|---|---|
| 0 | Reserved |
| 1 | Linear A/V service |
| 2 | Linear audio only service |
| 3 | App-based service |
| 4 | ESG service(program guide) |
| 5 | EAS service(emergency alert) |
| Other values | Reserved for future use |

(a)

| serviceCategory | Meaning |
|---|---|
| 6 | Data casting for TV |
| 7 | Data casting for Mobile |
| 8 | Data casting for Vehicle |

| Service | | 1..N | | Service information |
|---|---|---|---|---|
| | @serviceId | 1 | unsignedByte | Integer number that identifies this Service within the scope of this Broadcast area |
| | @sltSvcSeqNum | 1 | unsignedByte | Version of SLT service info for this service |
| | @isDataCasting | 0..1 | boolean | Indicates whether Service is for data casting or not |

FIG. 11

| Element and Attribute Names | | | Use | Data Type | Description |
|---|---|---|---|---|---|
| S-TSID | | | | | |
| | RS | | 1..N | | |
| | | @isDataCasting | 0..1 | boolean | Indicates whether Service is for data casting or not |
| | | LS | 1..N | | |

(a)

| Element and Attribute Names | | | Use | Data Type | Description |
|---|---|---|---|---|---|
| S-TSID | | | | | |
| | RS | | 1..N | | |
| | LS | | 1..N | | |
| | | @isDataCasting | 0..1 | boolean | Indicates whether Service is for data casting or not |

| Element or Attribute Name | | Use | Data Type | Description |
|---|---|---|---|---|
| SrcFlow | | | srcFlowType | Source flow carried in the LCT channel. |
| | @rt | 0..1 | boolean | Indication of whether the source flow conveys real-time content |
| | @minBuffSize | 0..1 | unsignedInt | The minimum number of kilobytes required in the receiver transport buffer for the LCT channel. |
| | EFDT | 0..1 | | The extended FDT instance. |
| | ContentInfo | 0..1 | string | Additional information that can be mapped to the application service that is carried in this transport session. |
| | Payload | 1..N | | Information on the payload of ROUTE packets carrying the objects of the source flow |
| | @codePoint | 0..1 | unsignedByte | A numerical representation of the combination of values specified for the child elements and attributes of the Payload element. |
| | @formatID | 1 | unsignedByte | The payload format of the delivery object. |
| | @frag | 0..1 | unsignedByte | Indication of how the payload of ROUTE packets carrying the objects of the source flow are fragmented for delivery. |
| | @order | 0..1 | unsignedByte | Indication of how the payload of ROUTE packets carrying the objects of the source flow as DASH Segments are delivered in the order of their generation by the DASH encoder |
| | @srcFecPayloadID | 0..1 | unsignedByte | Defined values of the Source FEC Payload ID. |
| | FECParams | 0..1 | | Parameters of the FEC scheme associated with the source flow, in the form of FEC Object Transmission Information. |

FIG. 13

| Element or Attribute Name | Use | Data Type | Description |
|---|---|---|---|
| EFDT | | | Provides the details of the file delivery data in the form of the Extended FDT instance which includes nominal FDT instance parameters. |
| @version | 0..1 | unsignedByte | The version of this Extended FDT instance descriptor. |
| @maxExpiresDelta | 0..1 | unsignedInt | Time interval for use in deriving the expiration time of the associated EFDT. |
| @maxTransportSize | 0..1 | unsignedInt | The maximum transport size of any object described by this EFDT. |
| FileTemplate | 0..1 | string | Describes the means to generate the file URL, i.e Content-Location attribute of the FDT). |
| FDTParameters | 0..1 | fdt:FDT-InstanceType | Any parameters allowed in the FLUTE FDT instance. |

FIG. 14

```
BEGIN
<?xml version="1.0" encoding="UTF-8"?>
<xs:schema xmlns="urn:ietf:params:xml:ns:fdt"
           xmlns:xs="http://www.w3.org/2001/XMLSchema"
           targetNamespace="urn:ietf:params:xml:ns:fdt"
           elementFormDefault="qualified">
  <xs:element name="FDT-Instance" type="FDT-InstanceType"/>
  <xs:complexType name="FDT-InstanceType">
    <xs:sequence>
      <xs:element name="File" type="FileType" maxOccurs="unbounded"/>
      <xs:any namespace="##other" processContents="skip"
             minOccurs="0" maxOccurs="unbounded"/>
    </xs:sequence>
    <xs:attribute name="Expires"
                  type="xs:string"
                  use="required"/>
    <xs:attribute name="Complete"
                  type="xs:boolean"
                  use="optional"/>
    <xs:attribute name="Content-Type"
                  type="xs:string"
                  use="optional"/>
    <xs:attribute name="Content-Encoding"
                  type="xs:string"
                  use="optional"/>
    <xs:attribute name="FEC-OTI-FEC-Encoding-ID"
                  type="xs:unsignedByte"
                  use="optional"/>
    <xs:attribute name="FEC-OTI-FEC-Instance-ID"
                  type="xs:unsignedLong"
                  use="optional"/>
    <xs:attribute name="FEC-OTI-Maximum-Source-Block-Length"
                  type="xs:unsignedLong"
                  use="optional"/>
```

FIG. 15

```
    <xs:attribute name="FEC-OTI-Encoding-Symbol-Length"
                  type="xs:unsignedLong"
                  use="optional"/>
    <xs:attribute name="FEC-OTI-Max-Number-of-Encoding-Symbols"
                  type="xs:unsignedLong"
                  use="optional"/>
    <xs:attribute name="FEC-OTI-Scheme-Specific-Info"
                  type="xs:base64Binary"
                  use="optional"/>
    <xs:anyAttribute processContents="skip"/>
</xs:complexType>
<xs:complexType name="FileType">
  <xs:sequence>
    <xs:any namespace="##other" processContents="skip"
            minOccurs="0" maxOccurs="unbounded"/>
  </xs:sequence>
  <xs:attribute name="Content-Location"
                type="xs:anyURI"
                use="required"/>
  <xs:attribute name="TOI"
                type="xs:positiveInteger"
                use="required"/>
  <xs:attribute name="Content-Length"
                type="xs:unsignedLong"
                use="optional"/>
  <xs:attribute name="Transfer-Length"
                type="xs:unsignedLong"
                use="optional"/>
  <xs:attribute name="Content-Type"
                type="xs:string"
                use="optional"/>
  <xs:attribute name="Content-Encoding"
                type="xs:string"
                use="optional"/>
  <xs:attribute name="Content-MD5"
                type="xs:base64Binary"
                use="optional"/>
  <xs:attribute name="FEC-OTI-FEC-Encoding-ID"
                type="xs:unsignedByte"
                use="optional"/>
  <xs:attribute name="FEC-OTI-FEC-Instance-ID"
                type="xs:unsignedLong"
                use="optional"/>
  <xs:attribute name="FEC-OTI-Maximum-Source-Block-Length"
                type="xs:unsignedLong"
                use="optional"/>
```

FIG. 16

```
    <xs:attribute name="FEC-OTI-Encoding-Symbol-Length"
                  type="xs:unsignedLong"
                  use="optional"/>
    <xs:attribute name="FEC-OTI-Max-Number-of-Encoding-Symbols"
                  type="xs:unsignedLong"
                  use="optional"/>
    <xs:attribute name="FEC-OTI-Scheme-Specific-Info"
                  type="xs:base64Binary"
                  use="optional"/>
    <xs:anyAttribute processContents="skip"/>
  </xs:complexType>
</xs:schema>
END
```

FIG. 17

```
<?xml version="1.0" encoding="UTF-8"?>
<S-TSID xmlns="urn:atsc:route:schema:stsid:2015"
        xmlns:xsi="http://www.w3.org/2001/XMLSchema-instance"
        serviceId="911">
   <RS bsid="1234" dIpAddr="239.91.1.1" dport="1001">
      <LS tsi="1">
         <SrcFlow>
            <EFDT tsi="1" maxTransportSize="46428226">
               <FDTParameters>
                  <File Content-Location="Hurricane_Irene_has_made_landfall_r1.html"
                     TOI="2"
                     Transfer-Length="68852"
                     Content-Length="68852"
                     Content-Type="text/html"/>
                  <File Content-Location="radar-loop-animated.gif"
                     TOI="3"
                     Transfer-Length="4221703"
                     Content-Length="4221703"
                     Content-Type="image/gif"/>
                  <File Content-Location="M-EAS_Evac_Routes_6Mbps.mp4"
                     TOI="4"
                     Transfer-Length="14563444"
                     Content-Length="14563444"
                     Content-Type="video/mp4"/>
               </FDTParameters>
            </EFDT>
            <Payload formatID="1" frag="0" srcFecPayloadID="1"/>
         </SrcFlow>
      </LS>
   </RS>
</S-TSID>
```

FIG. 18 audio

Available Formats

csv

| Name | Template | Reference |
|---|---|---|
| 1d-interleaved-parityfec | audio/1d-interleaved-parityfec | [RFC6015] |
| 32kadpcm | audio/32kadpcm | [RFC3802][RFC2421] |
| 3gpp | audio/3gpp | [RFC3839][RFC6381] |
| 3gpp2 | audio/3gpp2 | [RFC4393][RFC6381] |
| ac3 | audio/ac3 | [RFC4184] |
| AMR | audio/AMR | [RFC4867] |
| AMR-WB | audio/AMR-WB | [RFC4867] |
| amr-wb+ | audio/amr-wb+ | [RFC4352] |
| aptx | audio/aptx | [RFC7310] |
| asc | audio/asc | [RFC6295] |
| ATRAC-ADVANCED-LOSSLESS | audio/ATRAC-ADVANCED-LOSSLESS | [RFC5584] |
| ATRAC-X | audio/ATRAC-X | [RFC5584] |
| ATRAC3 | audio/ATRAC3 | [RFC5584] |
| basic | audio/basic | [RFC2045][RFC2046] |
| BV16 | audio/BV16 | [RFC4298] |
| BV32 | audio/BV32 | [RFC4298] |
| clearmode | audio/clearmode | [RFC4040] |
| CN | audio/CN | [RFC3389] |
| DAT12 | audio/DAT12 | [RFC3190] |
| dls | audio/dls | [RFC4613] |
| dsr-es201108 | audio/dsr-es201108 | [RFC3557] |
| dsr-es202050 | audio/dsr-es202050 | [RFC4060] |
| dsr-es202211 | audio/dsr-es202211 | [RFC4060] |
| dsr-es202212 | audio/dsr-es202212 | [RFC4060] |
| DV | audio/DV | [RFC6469] |
| DVI4 | audio/DVI4 | [RFC4856] |
| eac3 | audio/eac3 | [RFC4598] |
| encaprtp | audio/encaprtp | [RFC6849] |

FIG. 19

```xml
<?xml version="1.0" encoding="UTF-8"?>
<S-TSID xmlns="urn:atsc:route:schema:stsid:2015"
        xmlns:xsi="http://www.w3.org/2001/XMLSchema-instance"
        serviceId="911">
   <RS bsid="1234" dIpAddr="239.91.1.1" dport="1001">
      <LS tsi="1">
         <SrcFlow>
            <EFDT tsi="1" maxTransportSize="46428226">
               <FDTParameters>
                  <File Content-Location="ABC_Automobile_Firmware.pak"
                        TOI="2"
                        Transfer-Length="13368852"
                        Content-Length="13368852"
                        Content-Type="application/swupdate"/>
               </FDTParameters>
            </EFDT>
            <Payload formatID="1" frag="0" srcFecPayloadID="1"/>
         </SrcFlow>
      </LS>
   </RS>
</S-TSID>
```

FIG. 20

| Element or Attribute Name | Use | Data Type | Description |
|---|---|---|---|
| serviceLinakge | 0..1 | | Service linkage information |
| @bsid | 0..1 | unsignedShort | Reference to the broadcast stream associated with the SLT which includes the target service as an entry. This attribute shall be present when the value of @bsid in the SLT including the target service is different from the value of @bsid in the SLT including the current service. |
| @providerId | 0..1 | unsignedByte | Reference to the provider associated with the SLT which includes the target service as an entry. This attribute shall be present when the value of provider_id in the LLS table carrying the SLT including the target service as an entry is different from the value of provider_id in the LLS table carrying the SLT including the current service as an entry. |
| @serviceId | 1 | unsignedShort | Reference to the target service entry in the SLT. The value of this attribute is the same value of serviceId assigned to the entry. |
| @linkageType | 1 | unsignedByte | The value is assigned according to the table of fig. 21 in relation with in relation with the identifier that shows the linkage relationship between the current service and the target service |
| @activationTime | 0..1 | dateTime | The first moment when the linkage of the current service and the target service is active. If not given, the linkage is assumed to have been activated at some time in the past. |
| @deActivationTime | 1 | dateTime | The last moment when the linkage of the current service and the target service is active. |
| @serviceCategory | 0..1 | unsignedByte | Service category of the target service, coded per Table 5.5. The following values are not allowed:<br>4 ESG service (program guide)<br>5 EAS service (emergency alert)<br><br>This attribute shall be present if the SLT containing the current service as an entry does not include the target service as its entry. |
| @broadbandAccessRequired | 0..1 | boolean | Indicates whether broadband access is required for a receiver to make a meaningful presentation of the target service. This attribute shall be present if the SLT containing the current service as an entry does not include the target service as its entry. |
| @svcCapabilities | 0..1 | string | Required capabilities for decoding and meaningfully presenting content of the target service. |
| linkageData | 0..1 | any | Data needed for defining the linkageData in case additional data is needed for each Linkage Type |

FIG. 21

| linkageType | Meaning |
|---|---|
| 0 | Program Continuity<br>• The linkage relationship between the current service and the target service is activated after the @activationTime, and the linkage relationship with the current service is deactivated after the @deActivationTime |
| 1 | Service Replacement<br>• The target service can be automatically selected by the receiver at the @deActivationTime |
| 2 | Service or Program for Mobile<br>• The target service for Mobile is available between @activationTime and @deActivationTime. |
| 3 | Service or Program for Car<br>• The target service for Car is available between @activationTime and @deActivationTime. |
| other values | Reserved for future use |

FIG. 22

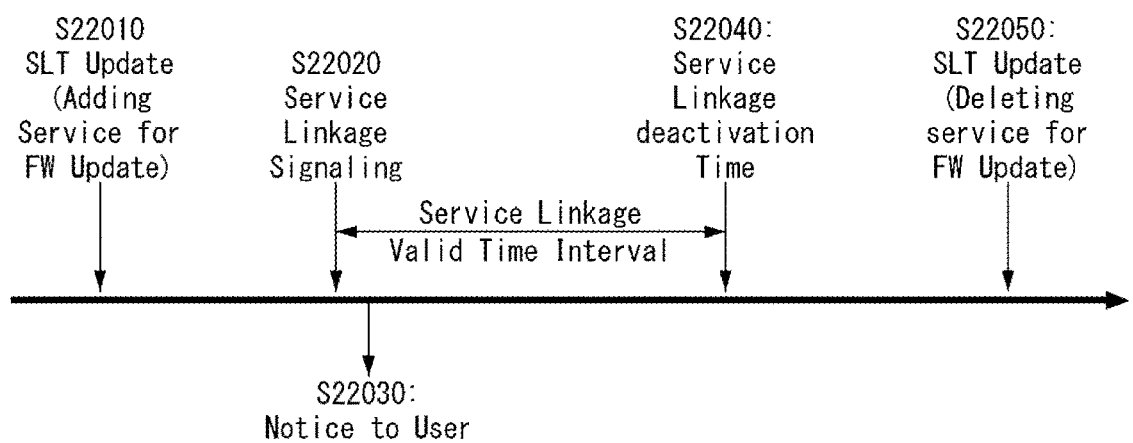

FIG. 23

```
<?xml version="1.0" encoding="utf-8"?>
<SLT xmlns="http://www.atsc.org/XMLSchemas/ATSC3/Delivery/SLT/1.0/" bsid="10">
  <Service serviceId="1" majorChannelNo="10" minorChannelNo="1" serviceCategory="1"
    shortServiceName="Service A" sltSvcSeqNum="0">
    <BroadcastSvcSignaling slsProtocol="1" slsMajorProtocolVersion="1"
      slsMinorProtocolVersion="0" slsPlpId="0" slsDestinationIpAddress="239.255.10.1"
      slsDestinationUdpPort="1001" slsSourceIpAddress="192.168.0.10"/>
  </Service>
</SLT>
```

[SLT with 1 A/V service]

```
<?xml version="1.0" encoding="utf-8"?>
<SLT xmlns="http://www.atsc.org/XMLSchemas/ATSC3/Delivery/SLT/1.0/" bsid="10">
  <Service serviceId="1" majorChannelNo="10" minorChannelNo="1" serviceCategory="1"
    shortServiceName="Service A" sltSvcSeqNum="0">
    <BroadcastSvcSignaling slsProtocol="1" slsMajorProtocolVersion="1"
      slsMinorProtocolVersion="0" slsPlpId="0" slsDestinationIpAddress="239.255.10.1"
      slsDestinationUdpPort="1001" slsSourceIpAddress="192.168.0.10"/>
  </Service>
  <Service serviceId="3" majorChannelNo="10" minorChannelNo="10" serviceCategory="3"
    shortServiceName="FW update" sltSvcSeqNum="0">
    <BroadcastSvcSignaling slsProtocol="1" slsMajorProtocolVersion="1"
      slsMinorProtocolVersion="0" slsPlpId="0" slsDestinationIpAddress="239.255.10.3"
      slsDestinationUdpPort="1003" slsSourceIpAddress="192.168.0.10"/>
  </Service>
</SLT>
```

[Updated SLT with FW update service]

FIG. 24

```
<?xml version="1.0" encoding="utf-8"?>
<bundleDescription xmlns="urn:3GPP:metadata:2005:MBMS:userServiceDescription"
  xmlns:r12="urn:3GPP:metadata:2013:MBMS:userServiceDescription"
  xmlns:atsc="urn:atsc:meta:data:2015:atsc3.0:userServiceDescription">
  <userServiceDescription globalServiceID="urn:atsc:serviceid:serviceA" serviceId="1001"
    fullMPDUri="mpd.xml" sTSIDUri="stsid.xml">
    <deliveryMethod>
      <broadcastAppService>
        <basePattern>video_stream</basePattern>
        <basePattern>audio_stream</basePattern>
      </broadcastAppService>
    </deliveryMethod>
    <PrivateExt>
      <serviceLinkage serviceId="1003" linkageType="3" activationTime="2016-11-11T10:00:00Z"
        deActivationTime="2016-11-11T12:00:00Z" serviceCategory="3"/>
    <PrivateExt>
  </userServiceDescription>
</bundleDescription>
```

ServiceLinkage information is added to PrivateExt element of USBD

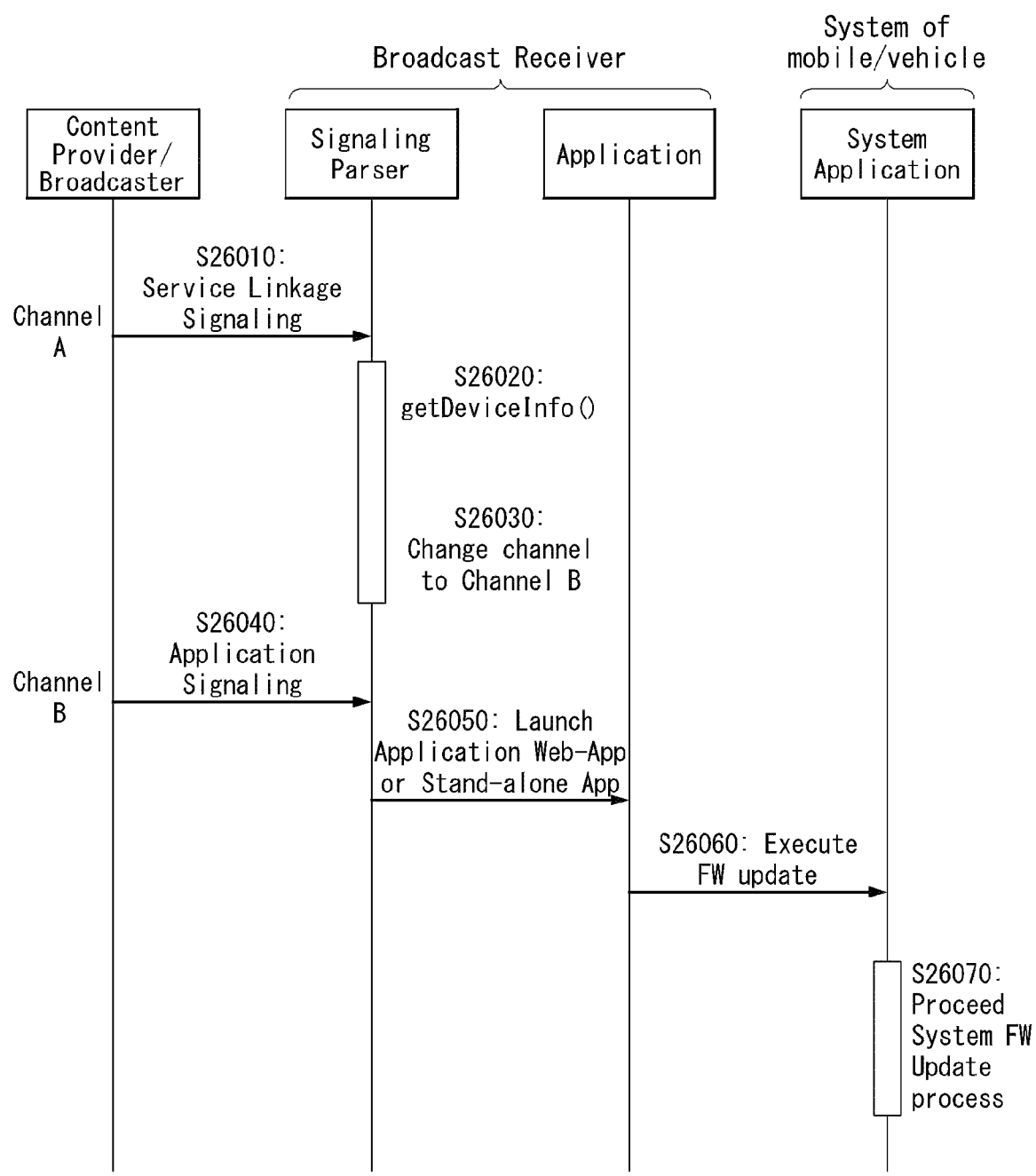

FIG. 27

| Service | 1..N | | Service information |
|---|---|---|---|
| @serviceId | 1 | unsignedByte | Integer number that identifies this Service within the scope of this Broadcast area |
| @sltSvcSeqNum | 1 | unsignedByte | Version of SLT service info for this service |
| DataCasting | 0..N | | Datacasting Information |
| @manufacturer | 1 | string | Manufacturer of target device, used for filtering target service |
| @model | 1 | string | model name/numbr of target device, used for filtering target service |
| @version | 1 | string | version of software/firmware, used for filtering target service |
| @priority | 1 | unsignedByte | Priority of dacasting service (ex: 0 (memdatory update) 1( update with user's approval) 2( update revocable) |
| @url | 0..1 | anyURI | URL for downloading service data via broadband |
| @usageReportUrl | 0..1 | anyURI | URL for report about the target service via broadband |

BROADCAST SIGNAL RECEPTION DEVICE AND BROADCAST SIGNAL RECEPTION METHOD

This application is a National Phase application of International Application No. PCT/KR2017/002766, filed Mar. 14, 2017, which is hereby incorporated by reference in their entirety for all purposes as if fully set forth herein.

TECHNICAL FIELD

The present invention relates to a broadcast signal reception device and a broadcast signal reception method, and more particularly, to a broadcast signal reception device provided in a mobile device or a vehicle or connected with a mobile system or a vehicle system and a broadcast signal reception method.

BACKGROUND ART

As analog broadcast signal transmission is terminated, various technologies for transmitting and receiving a digital broadcast signal have been developed. A digital broadcast signal is capable of containing a larger amount of video/audio data than an analog broadcast signal and further containing various types of additional data as well as the video/audio data.

DISCLOSURE

Technical Problem

A digital broadcast system may provide a high definition (HD) image, multi channel audio, and various additional services. Particularly, an advanced broadcast system such as advanced television system committee (ATSC) 3.0 may be connected with Internet network or communication network as well as a broadcast network to provide various services. Therefore, although TV may provide services through Internet/communication network not terrestrial broadcasting, a mobile device or vehicle in which a broadcast network reception chip is built may also receive services through a terrestrial broadcast network not Internet or communication network.

Technical Solution

To solve the aforementioned technical problem, the present invention suggests a broadcast signal receiver and a broadcast signal reception method.

To solve the aforementioned technical problem, a broadcast signal reception method according to the embodiment of the present invention comprises the steps of receiving a first broadcast signal through a first channel; parsing service list table (SLT) information included in the first broadcast signal; parsing service layer signaling (SLS) information received based on the SLT; and providing a broadcast service based on the SLS information, wherein the broadcast signal reception method further comprises the step of providing a data casting service if the SLS information includes service linkage information indicating a data casting service for firmware update of an external device connected with a broadcast signal reception device.

In the broadcast signal reception method according to the embodiment of the present invention, the step of providing a data casting service is a step of determining whether the external device is a target device of the data casting service, the target device corresponding to a mobile device or a vehicle system, and includes performing channel switching to a second channel through which the data casting service included in the service linkage information is provided, and performing firmware update based on a second broadcast signal received from the second channel.

In the broadcast signal reception method according to the embodiment of the present invention, the service linkage information includes at least one of broadcast stream ID information indicating the channel through which the data casting service is provided, and linkage type information indicating that the data casting service is a service for a mobile or vehicle.

In the broadcast signal reception method according to the embodiment of the present invention, the step of performing firmware update further includes acquiring data casting information included in the SLT information or the SLS information included in the second broadcast signal; determining whether to apply the firmware update, based on the data casting information; and requesting an application of the device to perform firmware update by using received update data if the firmware update is applied.

In the broadcast signal reception method according to the embodiment of the present invention, the data casting information includes at least one of manufacturer information on the firmware update, device model information, and firmware version information.

In the broadcast signal reception method according to the embodiment of the present invention, the SLT information includes service category information on a service described by the SLT information, the service category information including a data casting service for a mobile device or vehicle.

In the broadcast signal reception method according to the embodiment of the present invention, S-TSID information of the SLS information includes data casting identification information indicating whether a service described by the S-TSID (Service-based Transport Session Instance Description) is the data casting service.

To solve the aforementioned technical problem, a broadcast signal reception device according to the embodiment of the present invention comprises a communication unit for receiving a broadcast signal; a memory for storing data; and a processor for controlling the communication unit and the memory, wherein the broadcast signal reception device receives a first broadcast signal through a first channel, parses service list table (SLT) information included in the first broadcast signal, parses service layer signaling (SLS) information received on the basis of the SLT, and provides a broadcast service based on the SLS information, and wherein the broadcast signal reception device provides a data casting service if the SLS information includes service linkage information indicating a data casting service for firmware update of an external device connected with the broadcast signal reception device.

Advantageous Effects

According to the embodiment of the present invention, a data casting service such as system or software update of a mobile device or vehicle may be provided using a broadcast system.

A broadcast receiver according to the embodiment of the present invention may be connected to a channel or broadcast stream to which a data casting service is provided through service linkage information.

The broadcast receiver according to the embodiment of the present invention may determine whether an external device connected with the broadcast receiver is a target device of a data casting service, based on service category information included in SLT information or data casting identification information included in SLS information. Therefore, the broadcast receiver may receive a data casting service only if necessary without providing a user with an irrelevant service.

The broadcast receiver according to the embodiment of the present invention may determine whether to apply firmware update of the data casting service for an external device by using data casting information. Therefore, the broadcast receiver may filter unnecessary update depending on a manufacturer, model, software version, etc. of the external device.

The broadcast receiver according to the embodiment of the present invention may notify a user of availability of the data casting service such as firmware update and provide a service in accordance with selectin of the user.

Hereinafter, the other effects of the present invention will be described together with the configuration of the invention.

BRIEF DESCRIPTION OF THE DRAWINGS

FIG. 3 is a view illustrating a low level signaling (LLS) table and a service list table (SLT) according to one embodiment of the present invention.

FIG. 4 is a view illustrating USBD and S-TSID delivered through ROUTE, according to one embodiment of the present invention.

FIG. 5 is a view illustrating USBD delivered to MMT, according to one embodiment of the present invention.

FIG. 8 is a view illustrating a signaling method of a data casting service according to one embodiment of the present invention.

FIG. 9 is a view illustrating a signaling method of a data casting service according to another embodiment of the present invention.

FIG. 11 is a view illustrating a signaling method of a data casting service according to other embodiment of the present invention.

FIG. 12 is a view illustrating source flow information according to the embodiment of the present invention.

FIG. 13 is a view illustrating EFDT information included in source flow information according to the embodiment of the present invention.

FIGS. 14 to 16 are views illustrating XML schema of FDT defined in FLUTE according to the embodiment of the present invention.

FIG. 17 is a view illustrating S-TSID configured during file transmission based on the aforementioned FDT parameter information (FDPparameter).

FIG. 18 is a view illustrating a portion of media types defined in IANA according to the embodiment of the present invention.

FIG. 19 is a view illustrating S-TSID configured during file transmission based on FDT parameter information, to which a content type for software update is added.

FIG. 20 is a view illustrating a service linkage table according to one embodiment of the present invention.

FIG. 21 is a view illustrating a linkage type table according to the embodiment of the present invention.

FIG. 22 is a view illustrating a method for providing a dedicated service using service linkage information according to the embodiment of the present invention.

FIG. 23 is a view illustrating an SLT update method for signaling FW update service according to the embodiment of the present invention.

FIG. 24 is a view illustrating a method for signaling service linkage information according to the embodiment of the present invention.

FIG. 26 is a view illustrating a method for providing a data casting service according to the embodiment of the present invention.

FIG. 27 is a view illustrating data casting information of SLT according to the embodiment of the present invention.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood according to the intended meanings of the terms rather than their simple names or meanings.

The present invention provides a broadcast signal transmission and reception apparatuses and methods for future broadcast services. Future broadcast services according to one embodiment of the present invention include a terrestrial broadcast service, a mobile broadcast service, a UHDTV service, etc. The present invention may process broadcast signals for the future broadcast services through non-Multiple Input Multiple Output (MIMO) or MIMO according to one embodiment. A non-MIMO scheme according to one embodiment of the present invention may include a Multiple Input Single Output (MISO) scheme, a Single Input Single Output (SISO) scheme, etc. The present invention suggests a physical profile (or system) optimized to minimize receiver complexity while achieving performance required for a specific purpose of use.

Figure 1:
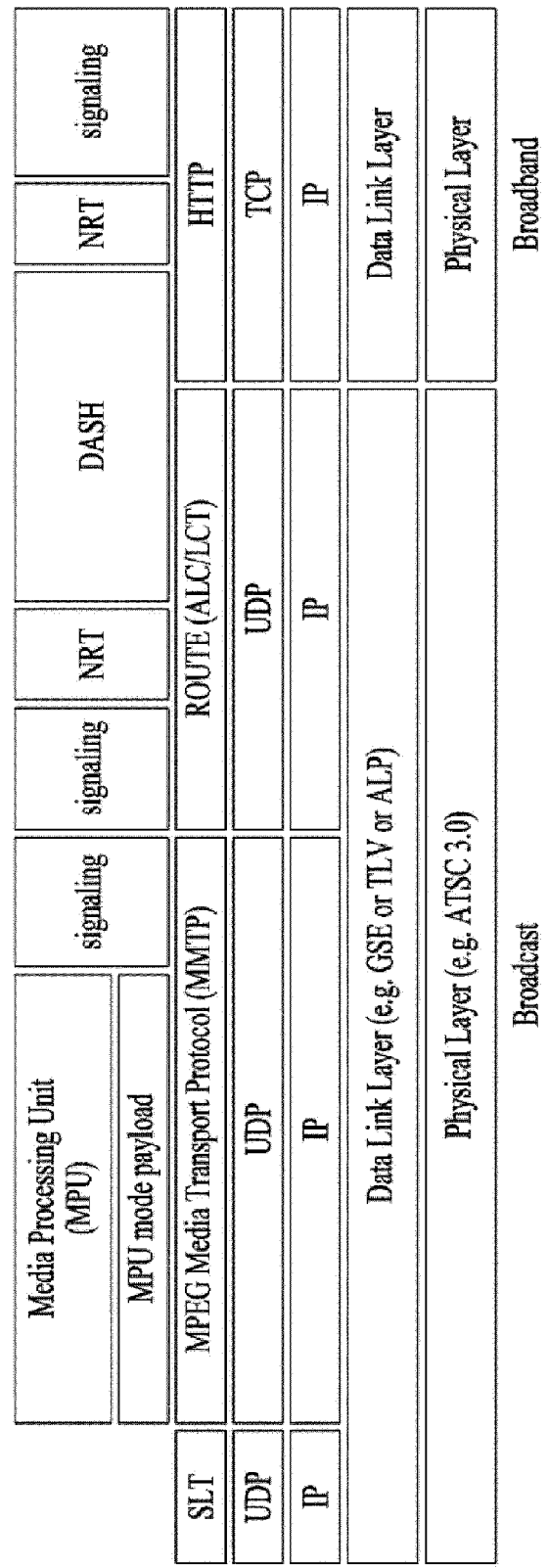
FIG. 1 is a view illustrating a protocol stack according to one embodiment of the present invention.

FIG. 1 is a view illustrating a protocol stack according to one embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast network or broadband at a physical layer.

In this case, the service data may be generated in an ISO base media file format (BMFF). ISO BMFF media files may be used for broadcast network/broadband delivery, media encapsulation and/or synchronization format. The service data are all data related to the service and may include service components constituting a linear service, signaling information thereof, non-real time (NRT) data and other files.

The delivery layer will be described. The delivery layer may provide a function for transmitting service data. The service data may be delivered through a broadcast network and/or broadband.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed in accordance with MMTP or ROUTE protocol may be processed into IP packets through a UDP/IP layer. In service data delivery over the broadcast network, a service list table (SLT) may also be delivered over the broadcast network through the UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. These data may be processed through HTTP/TCP/IP and delivered to a physical layer for broadband transmission through a link layer for broadband transmission.

The physical layer may process the data received from the delivery layer (higher layer and/or link layer) and transmit the data over the broadcast network or broadband. A detailed description of the physical layer will be given later.

The service will be described. The service may be a collection of service components displayed to a user, the components may be of various media types, the service may be continuous or intermittent, the service may be real time or non-real time, and a real-time time service may include a sequence of TV programs.

The service may have various types. First, the service may be a linear audio/video or audio service having app based enhancement. Second, the service may be an app based service of which reproduction/configuration is controlled by a downloaded application. Third, the service may be an ESG service for providing an electronic service guide (ESG). Fourth, the service may be an emergency alert (EA) service for providing emergency alert information.

When a linear service having no app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. In this case, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media are formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal at a specific frequency while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
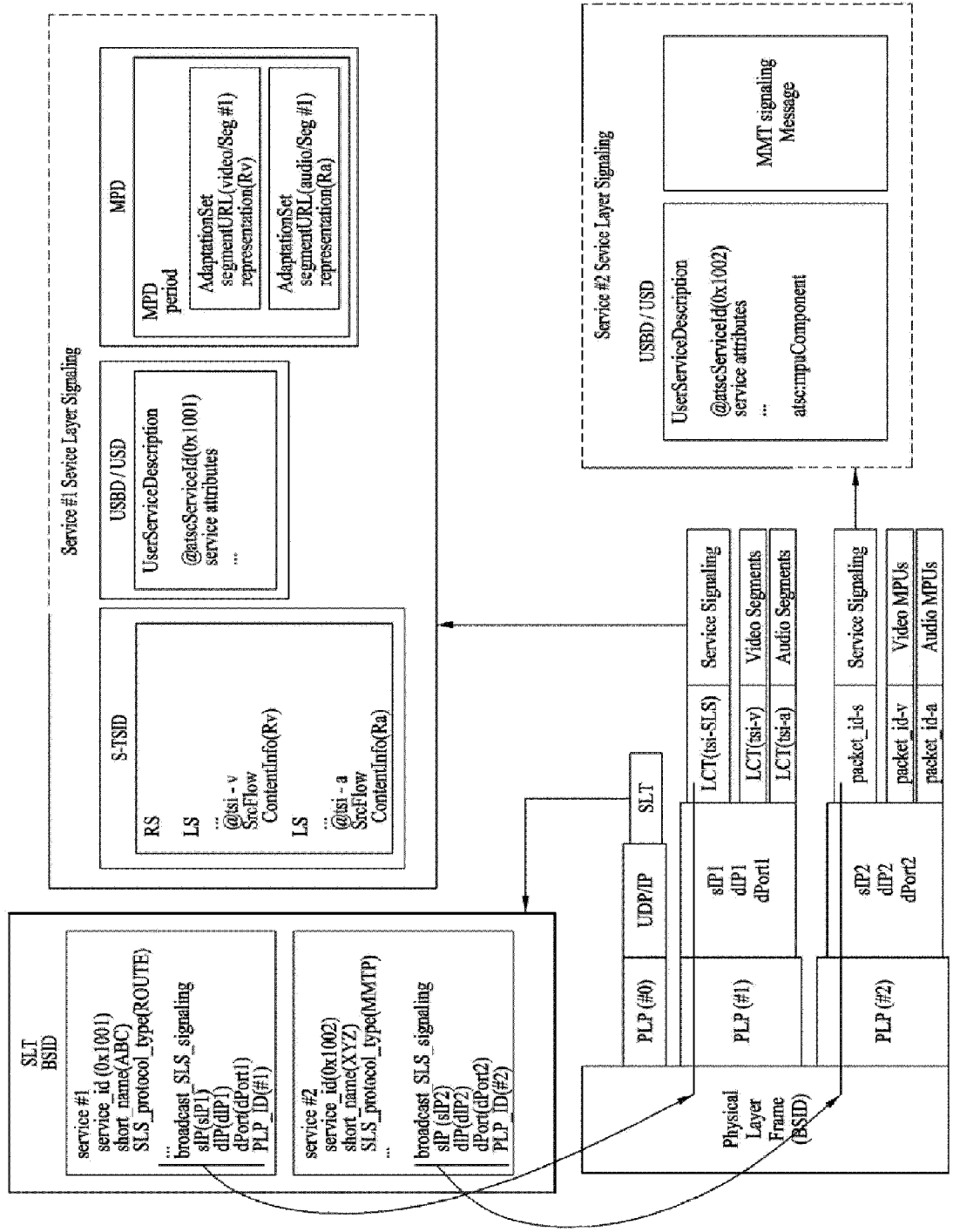
FIG. 2 is a view illustrating a service discovery procedure according to one embodiment of the present invention.

FIG. 2 is a view illustrating a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT in accordance with its type. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the corresponding SLS. The SLS of service #2 described in the SLT is delivered through MMT and the SLT may include bootstrap information sIP2, dIP2 and dPort2 of the MMTP session including the MMTP packet flow delivered by the corresponding SLS.

The SLS is signaling information describing the properties of the corresponding service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

In this case, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast network/broadband). A detailed description of the USBD/USD will be given below.

The S-TSID is one of SLS fragments and may provide overall session description information of a transport session carrying the service component of the corresponding service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the corresponding service. The MPD may provide a resource identifier of media segments and provide context information within the media presentation of the identified resources. The MPD may describe DASH representation (service component) delivered over the broadcast network and describe additional DASH representation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

In this case, the USBD is one of SLS fragments and may describe detailed description information of a service as in ROUTE. This USBD may include reference information (URI reference) of other SLS fragments. The USBD of the MMT may reference an MP table of MMT signaling. In some embodiments, the USBD of the MMT may include reference information of the S-TSID and/or the MPD. In this case, the S-TSID is for NRT data delivered through the ROUTE protocol. This is because that NRT data may be delivered through the ROUTE protocol even when a linear service component is delivered through the MMT protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the corresponding service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. In this case, the asset is a multimedia data entity, is combined by one unique ID, and may mean a data entity used to generate one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the S-TSID, the USBD/USD and the MPD may be referred to as a service signaling channel. In case of MMTP, the USBD/UD, the MMT signaling message or the packet flow delivering the USBD/UD and the MMT signaling message may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may divisionally be delivered to a ROUTE session and an MMTP session. Although not shown, components configuring one service may be delivered through broadband (hybrid delivery).

FIG. 3 is a view illustrating a low level signaling (LLS) table and a service list table (SLT) according to one embodiment of the present invention.

One embodiment t3010 of the shown LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. In this case, the service provider is a broadcaster using all or some of the broadcast streams and the provider_id field may identify one of a plurality of broadcasters which are using the broadcast streams. The LLS_table_version field may provide the version information of the LLS table.

In accordance with the value of the LLS_table_id field, the LLS table may include one of the above-described SLT, a rating region table (RRT) including information on content advisory rating, SystemTime information for providing information associated with a system time, and a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted depending on the value of the shown Use column or a plurality of fields may be present.

The @bsid attribute may be an identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include a @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @maj orChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) to the SLS is delivered. These may be included in the bootstrap information.

FIG. 4 is a view illustrating USBD and S-TSID delivered through ROUTE, according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted depending on the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast network or broadband as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast network or broadband of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. In accordance with the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the corresponding S-TSID. These fields may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted, and the PLP ID information of the ROUTE session may be checked using a combination of the information of the below-described LMT and the IP address/UDP port information of the RS element.

The LS element may describe information on LCT channels through which the service components of the service are transmitted. In accordance with the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object, and at least source flow may be established within one ROUTE session. The source flow may deliver associated objects as an object flow.

The RepairFlow element may describe the repair flow of ROUTE. Delivery objects delivered in accordance with the source protocol may be protected in accordance with forward error correction (FEC), and the repair protocol may define an FEC framework enabling FEC protection.

FIG. 5 is a view illustrating USBD delivered through MMT, according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted in accordance with the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service delivered through ROUTE. Even when linear service components are delivered through the MMT protocol, NRT data may be delivered in accordance with the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between the broadcast network and broadband. When the broadcast signal is weak, the service component is acquired over broadband and, when the broadcast signal becomes strong, the service component is acquired over the broadcast network to secure service continuity.

The ComponentInfo element may include information on the service components of the service. In accordance with the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @s TS IDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered in accordance with the ROUTE protocol in a state of delivering linear service components in accordance with the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentld attribute may indicate the identifier of the service component. The value of this attribute may be the same value as the asset id (asset ID) of the MP table corresponding to this service component. The @componentName attribute may indicate the name of the service component.

Hereinafter, a method for updating a mobile device or a vehicle system by using a future broadcast system will be described. As an embodiment, the future broadcast system may be ATSC 3.0. The broadcast system may transmit a data casting service to provide a mobile service or a vehicle service. Hereinafter, a method for signaling a mobile service or a vehicle service in a broadcast system and a method for identifying and processing a mobile service or a vehicle service in a receiver will be described.

Figure 6:
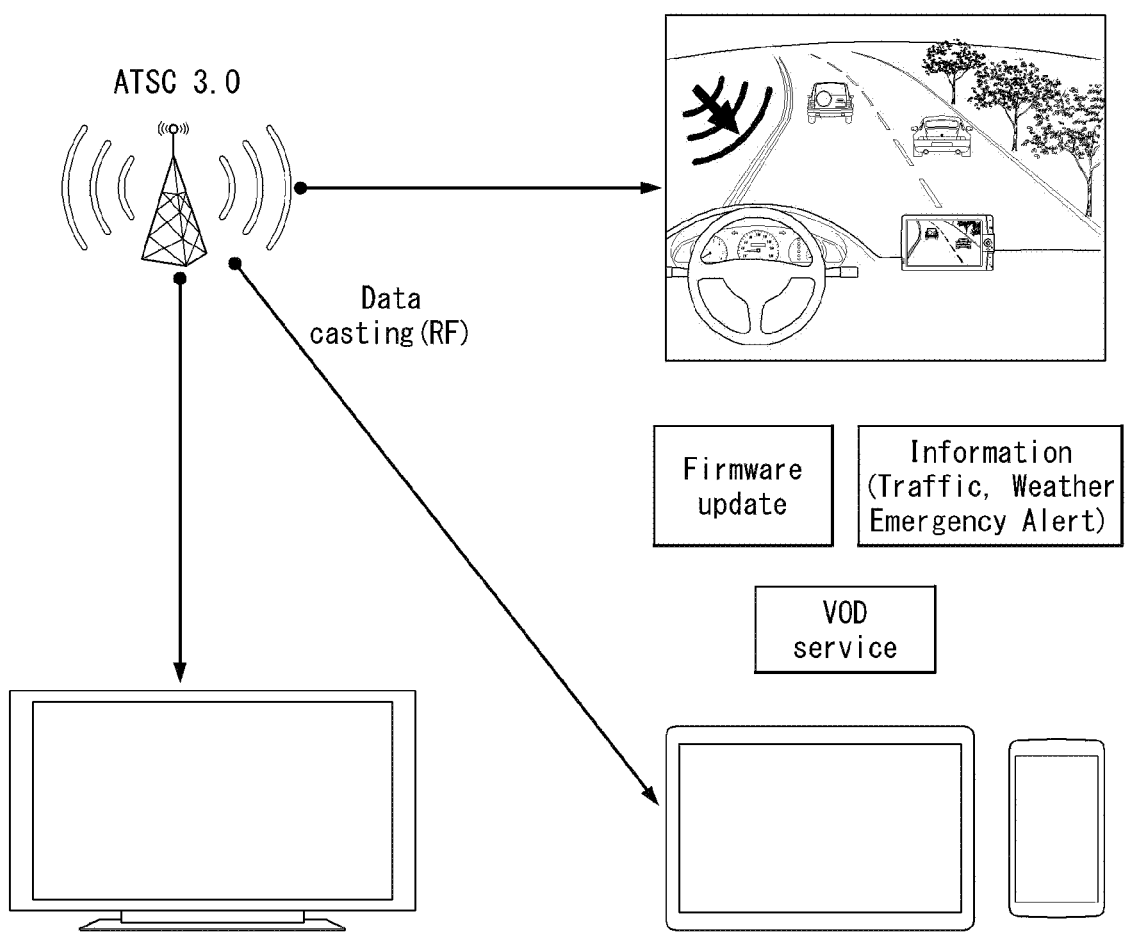
FIG. 6 is a view illustrating a data casting method of a broadcast system according to one embodiment of the present invention.

FIG. 6 is a view illustrating a data casting method of a broadcast system according to one embodiment of the present invention.

The future broadcast system may provide a data casting service as well as typical broadcasting. The future broadcast system may provide various services by using Internet or communication network as well as a broadcast network.

As shown in FIG. 6, a broadcast signal receiver in this specification means various electronic devices capable of receiving and processing broadcast signals, including a mobile device and a vehicle communication device without only meaning the existing broadcast receiver such as TV and set-top box. In one embodiment, the broadcast system may allocate frequencies for data casting by adaptively controlling a bit rate of basic transmission A/V if an idle frequency bandwidth is used or in case of no peak time.

Various types of data packages of large capacities may be transmitted to a wide area through a broadcast network. Also, data may simultaneously be transmitted to a plurality of receivers within broadcast network coverage in a multi-cast transmission scheme. Also, cost efficient data transmission compared with services through Internet/communication network may be achieved using the existing infrastructure.

If the broadcast receiver includes a local storage, the broadcast receiver may provide various second devices with services by retransmitting received data.

Figure 7:
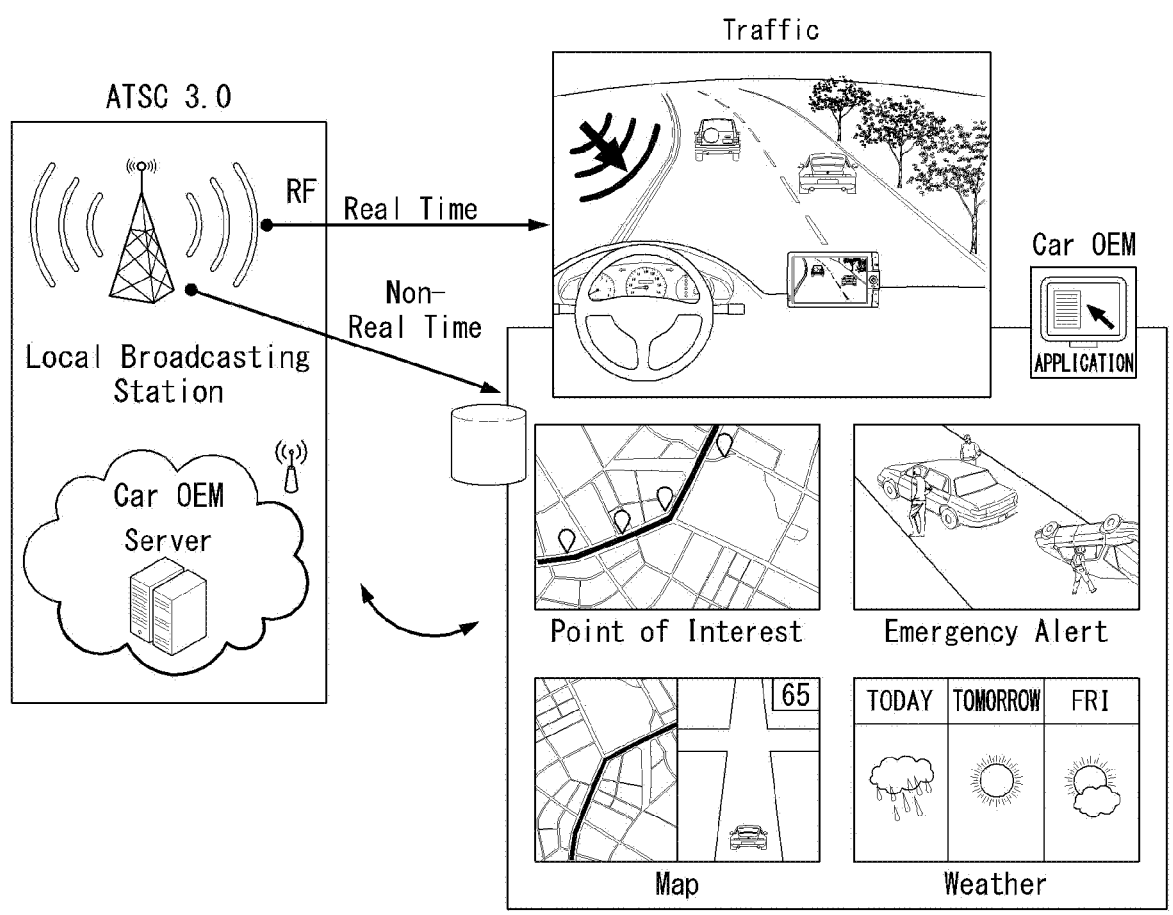
FIG. 7 is a view illustrating a real time/non-real time data casting service according to one embodiment of the present invention.

FIG. 7 is a view illustrating a real time/non-real time data casting service according to one embodiment of the present invention.

Since the broadcast system provides non-real-time transmission as well as real-time transmission, the broadcast system may provide flexible services according to the non-real-time transmission. As an embodiment, in case of the vehicle service, the broadcast system may transmit service data for traffic information in real time, and may transmit service data for VOD in non-real-time. The broadcast receiver provided in the vehicle may receive non-real time transmission time to which a power source is supplied. Therefore, the broadcast receiver of the vehicle may receive data any time in a state of driving or power-on state of a radio.

In addition, a format of data transmitted from the future broadcast system may be less restrictive. As an embodiment, an application provided by a service provider, metadata used by the application, and data (for example, image, icon, etc.) may be transmitted through a broadcast network, and the receiver may provide such data on the screen. Also, the broadcast system may transmit some data through a broadcast network and transmit some other data through Internet/communication network. As an embodiment, in case of disaster broadcasting, an application or image having less capacity may be transmitted through Internet/broadcast network, and a moving image having large capacity may be transmitted through a broadcast network. The receiver may execute a disaster broadcast application received through Internet/broadcast network and provide a related text or image. The receiver may reproduce a disaster related moving image downloaded through the broadcast network or reproduce the disaster related moving image in a real-time streaming mode.

In the present invention, signaling capable of identifying a data casting service in the receiver is required to provide the data casting service. Hereinafter, a signaling method of a data casting service will be described.

FIG. 8 is a view illustrating a signaling method of a data casting service according to one embodiment of the present invention.

As described above, SLT information included in LLS information is information for starting processing if the receiver receives a broadcast signal. That is, the SLT provides bootstrap information capable of building a service list, which can be received by the receiver, and discovering SLS information for each service. As described in FIG. 3, the SLT information includes a service category attribute. The service category attribute is signaling data indicating a service provided by the SLT.

FIG. 8 illustrates an embodiment of service category information included in SLT according to the embodiment of the present invention.

FIG. 8(a) illustrates a service category indicated by a service category attribute of the future broadcast system. That is, the service category information of FIG. 8(a) indicates that categories of the corresponding service are linear A/V service, linear audio only service, app-based service, ESG service (program guide), and EAS (emergency alert service), respectively, if it has values of 1 to 5.

As shown in FIG. 8(b), a data casting service may be added to the service category information. The broadcast system may indicate that a specific service is for the data casting service by designating a value for data casting in the service category attribute. The receiver may identify a category of a specific service by parsing the SLT. Therefore, the receiver which does not support data casting may filter or bypass data corresponding to the data casting service.

FIG. 8(b) illustrates an embodiment in which different values are allocated depending on a target device of a data casting service. That is, the service category information may indicate a data casting service for the broadcast receiver such as TV if its value is 6, data casting buses for a mobile device if its value is 7, and a data casting service for a vehicle if its value is 8. In FIG. 8(b), a data casting service for a receiver of a specific type is defined. However, unlike the embodiment of FIG. 8(b), one value may be used to indicate a data casting service.

FIG. 9 is a view illustrating a signaling method of a data casting service according to another embodiment of the present invention.

As described above, the SLT of FIG. 3 includes a service element that provides service information signaled by the SLT. Various attributes/information included in the service element describe a service.

As shown in FIG. 9, an attribute for identifying a data casting service may be added to the service element. A description of the attribute/information added to the SLT in FIG. 9 is as follows.

@isDataCasting: is an attribute of a Boolean type, and may indicate that the corresponding service is a data casting service if its value is set to "true" and indicate that the corresponding service is not a data casting service if its value is set to "false". As an embodiment, a default value may be "false".

As an embodiment, an @isDataCasting attribute may be referred to as data casting identification information. If the data casting identification information indicates a data casting service, a service category of this service may be set to an app-based service of FIG. 8(a). Alternatively, the service category of this service may be set to the added service category information of FIG. 8(b).

Figure 10:
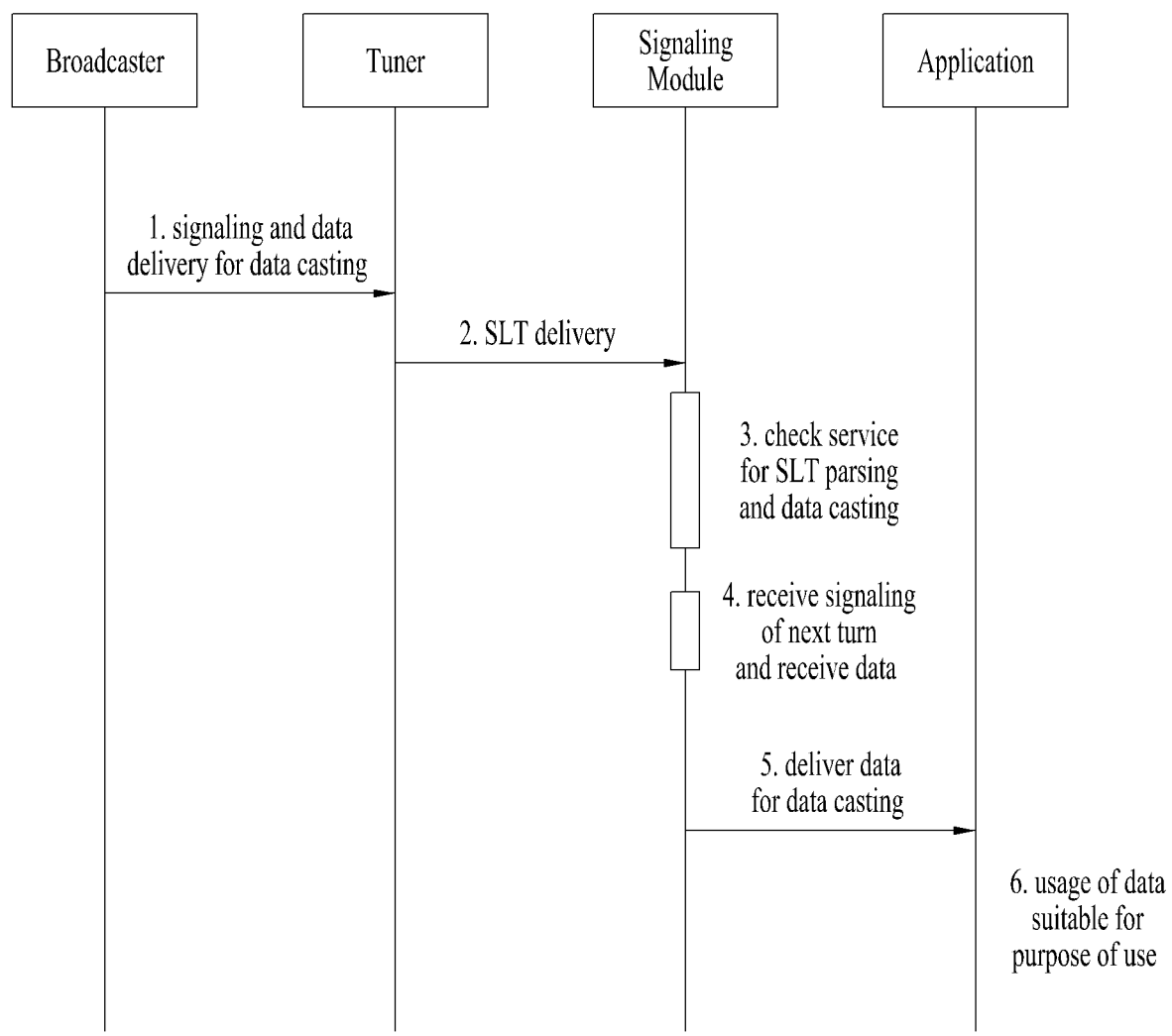
FIG. 10 is a view illustrating data casting service signaling of a broadcast system and a processing method of signaling information according to the embodiment of the present invention.

FIG. 10 is a view illustrating data casting service signaling of a broadcast system and a method for transmitting and receiving service data according to the embodiment of the present invention.

In FIG. 10, a tuner 1020, a signaling module 1030, and an application 1040 may be provided in the receiver.

A broadcaster 1010 may transmit signaling information and data for data casting through a broadcast network. The signaling information may be transmitted as described in the embodiments of FIGS. 8 and 9.

The receiver may receive broadcast signals by using the tuner 1020, and the SLT included in the broadcast signals may be delivered to the signaling module 1030.

The signaling module 1030 may parse the SLT and check a value of @isDataCasting information. If the receiver does not support a data casting function, the receiver may not receive or process corresponding service data regardless of the value of the @isDataCasting information.

The signaling module 1030 may parse the SLT, and receive/parse SLS information on the corresponding service subsequently to the SLT if the value of the @isDataCasting information is "true", and may receive data for data casting by using the SLS information. The received data casting data may be delivered to the application 1040.

The application 1040 may process and use data in accordance with a preset operation of the application. As an embodiment, if the application is an application firmware update, the application 1040 may perform firmware update by using the delivered data. In the present invention and specification, firmware refers to software, and does not refer to a meaning functionally different from software.

In the embodiments of FIGS. 8 to 10, since a data casting service may be identified in SLT level of low level signaling, the receiver may determine whether to quickly receive/process a data casting service. However, the service provider may provide data casting by leasing an idle frequency of a specific service provider instead of using all services as data casting. In this case, it is difficult to identify a service in signaling of a service basis in the SLT.

FIG. 11 is a view illustrating a signaling method of a data casting service according to other embodiment of the present invention.

In addition to the data casting signaling method of a service basis in the SLT, a data casting signaling method using the SLS may be used. That is, in order to identify a data casting service in addition to a basic service (for example, AV service), filtering of a session level may be required.

As described above, signaling data of the ROUTE protocol may include Service-based Transport Session Instance Description (S-TSID) of FIG. 4. The STSID may include RS element describing a Route Session. The RS element may include data casting identification information (@isData-Casting attribute) as shown in FIG. 11(a). The data casting identification information has been described as above.

As described above, the RS element of the S-TSID of FIG. 4 may include LS element which is a sub element. The LS element includes information on LCT channel carrying at least one content component. The LS element may include data casting identification information (@isDataCasting attribute) as shown in FIG. 11(b). The data casting identification information has been described as above.

In addition to the aforementioned embodiments, a method for adding a value of a content-type of attributes expressing files transmitted for data casting may be used to signal data for a specific purpose of use.

As described above, the S-TSID of FIG. 4 includes an SrcFlow element. The SrcFlow element provides information on a source flow included in the LCT channel if present.

FIG. 12 is a view illustrating source flow information according to the embodiment of the present invention.

FIG. 13 is a view illustrating EFDT information included in source flow information according to the embodiment of the present invention.

An extended FDT (EFDT) describes extended file delivery table (FDT) instance. FFDT information may include sub attribute/information as shown in FIG. 13.

In FIG. 13, an FDPparameter element describes parameters defined in FLUTE FDT. File Delivery over Undirectional Transport (FLUTE) RFC 6726 is a protocol mainly delivering files in a multicast environment, and delivers a file delivery table (FDT) to deliver files. The receiver may receive FDT, and may receive files based on a value described in the FDT.

FIGS. 14 to 16 are views illustrating XML schema of FDT defined in FLUTE according to the embodiment of the present invention.

FIG. 17 is a view illustrating S-TSID configured during file transmission based on the aforementioned FDT parameter information (FDPparameter).

A Content-Type is included as a sub attribute of the FDTPparameter element. The Content-Type attribute may be referred to as content type information. The content type specifies a type indicating a characteristic of files, and this type is defined in the name of a media type in the Internet Assigned Numbers Authority (IANA).

FIG. 18 is a view illustrating a portion of media types defined in IANA according to the embodiment of the present invention.

A new media type may be added to identify a file for data casting. The existing media type may be used for predefined data as shown in FIG. 18, whereas a new media type may additionally be defined for data casting for a specific purpose of use such as software update. For example, a content type for software update such as application/swupdate may additionally be defined.

FIG. 19 is a view illustrating S-TSID configured during file transmission based on FDT parameter information (FDPparameter), to which a content type for software update is added. FIG. 19 illustrates an embodiment in which a media type for data casting is added.

Hereinafter, a signaling method of a mobile service or vehicle service in a broadcast system will be described.

The future broadcast system may transmit a content for a communication device of a mobile device or vehicle as well as a content for TV or set top box. In this environment, a broadcast station may provide a service specialized for a mobile device or a service specialized for a vehicle. As an embodiment, the mobile service includes providing target advertisement according to a user location. As another embodiment, the vehicle service includes a data casting service such as FW update of a vehicle infotainment system using a broadcast network.

The broadcast station transmits all services for a fixed TV, a mobile device, and a vehicle communication device, and the broadcast receiver should identify and receive/process a service suitable for each type. Hereinafter, a method for signaling a mobile service or vehicle service and a method for identifying and receiving such a service in a receiver will be described.

FIG. 20 is a view illustrating a service linkage table according to one embodiment of the present invention.

The service linkage table may be referred to as service linkage information. The service linkage information is information for providing a service associated with a current service. That is, as an embodiment, if the current service ends at a specific time and a service which is not scheduled may be provided to a user, the receiver which has received the service linkage information may provide the user with information associated with the service. The user may consume a service according to the linkage information subsequently to the current service.

In FIG. 20, a description of sub attributes included in the service linkage is as follows. Hereinafter, a target service may correspond to a data casting service.

@bsid: broadcast stream ID attribute provides a reference of a broadcast stream associated with SLT, which includes a target service as an entry. This attribute may be present if a value of the @bsid attribute included in the SLT, which includes the target service, is different from a value of the @bsid attribute within the SLT which includes the current service.

@providerID: provider ID attribute provides a reference of a provider associated with SLT, which includes a target service as an entry. This attribute may be present if a provider_value within LLS table carrying the SLT, which includes the current service as an entry, is different from a provider_id value within the LLS table carrying SLT, which includes the current service as an entry.

@serviceID: service ID attribute provides a reference for a target service entry within the SLT. A value of this attribute has the same value as that of service ID assigned to the entry.

@linkageType: linkage type attribute may be assigned as shown in Table of FIG. 21. The linkage type attribute is an identifier indicating a linkage relationship between the current service and the target service.

@activationTime: activation time attribute may indicate an initial moment when a linkage between the current service and the target service becomes active. If not given, linkage may be estimated to be activated at the past time.

@deActivationTime: deactivation time attribute may indicate a final moment when a linkage between the current service and the target service becomes active.

@serviceCatogory: service category attribute may indicate a service category of a target service coded in accordance with a specific table. However, values such as 4: ESG service (program guide) and 5: EAS service (emergency alert) may not be allowed in a specific table. This attribute may not be present if the SLT for the current service does not include the target service.

@broadbandAccessRequired: broadband access required attribute may indicate whether broadband access is required for the receiver to make meaningful presentation. This attribute may be present if the SLT for the current service does not include the target service.

@svcCapabilities: service capabilities attribute may indicate capabilities required to decode and meaningfully present a content of the target service.

linkageData: linkage data element is data required to define linkage data if additional data required for each linkage type is required.

FIG. 21 is a view illustrating a linkage type table according to the embodiment of the present invention.

In FIG. 21, linkage type information is a table allocated to the linkage type attribute shown in FIG. 20.

As an embodiment, linkage type 0 indicates program continuity. A linkage relationship between the current service and the target service may be activated after the time of @activationTime and deactivated after the time of @deActivationTime.

As an embodiment, linkage type 1 indicates service replacement. The target service may be selected automatically after the time of @deActivationTime.

As an embodiment, linkage type 2 indicates a service or program for a mobile device. The target service for a mobile device is available between the duration of @activationTime and the duration of @deActivationTime. Linkage type 2 may be a dedicated service for mobile broadcast of the broadcast system. A service such as GPS based target advertisement may be provided.

As an embodiment, linkage type 3 indicates a service or program for a car/vehicle. The target service for a vehicle may be available between the time of @activationTime and the time of @deActivationTime. The linkage type 3 may be a service for a vehicle of the broadcast system. The GPS based target advertisement or service such as FW upgrade of the vehicle infotainment system may be provided.

As shown in FIG. 21, a linkage type for a mobile service and a linkage type for a vehicle service may be added to the linkage type field of the service linkage table. The broadcast receiver may determine whether to provide a dedicated service to the user by identifying a device type of the receiver.

As a mobile dedicated service which has used service linkage, GPS based target advertisement service may be provided. The broadcast station may maximize an advertisement effect by providing advertisement and coupon to the user at a desired time and place. As an embodiment, GPS location based advertisement service or coupon service may be provided to a TV viewer who uses a mobile in the same broadcast channel. A popup "coupon available" may be displayed by the mobile device at a specific time and in a specific place by service linkage. If the user selects the popup, the receiver may receive a related service by moving to an app-based service channel connected by service linkage. Since a dedicated service is provided at a limited time/place based on position time, an advertisement effect may be increased.

As a vehicle dedicated service which has used service linkage, a data casting service such as FW update may be provided. The broadcast station may provide a data dedicated service for a desired time, and may not expose the corresponding service to TV viewers of general homes. As an embodiment, the broadcast system may provide FW update through a broadcast network to only users who use a broadcast service within a vehicle in the same broadcast channel at the same time zone. A popup "new firmware available" may be displayed at a specific time zone based on the service linkage information. If the user selects the popup, the receiver may receive a firmware update related service by moving to an app-based service channel connected by service linkage. An app provided by the app based service may be a broadcast station app executed through app signaling. The broadcast station may execute a native app built in a vehicle per OEM. Infotainment firmware of the vehicle may be updated through the native app.

FIG. 22 is a view illustrating a method for providing an update service using service linkage information according to the embodiment of the present invention.

In step S22010, the broadcast station may add a service, which will be used in service linkage, to the SLT. The service may be added to the SLT through SLT update. The user may not recognize service addition.

In step S22020, the broadcast station may transmit service linkage information to the receiver. The service linkage information may be delivered to the receiver through update of USBD which is an SLS table.

In step S22030, the receiver may receive service linkage information and notify the user of the corresponding information. The receiver may display a popup "New Firmware Available" or provide this message as audio.

In step S22040, a data casting service based on service linkage information may be effective up to the service linkage deactivation time. The receiver may end receiving/providing the corresponding service if it reaches the service linkage deactivation time.

In step S22050, the broadcast station may delete the service used for service linkage through SLT update after the deactivation time.

Hereinafter, the aforementioned steps will be described in more detail.

FIG. 23 is a view illustrating an SLT update method for signaling FW update service according to the embodiment of the present invention.

The broadcast station may signal updated SLT by using a service, which will be used for service linkage, in SLT. Firmware data for firmware update may already be downloaded through a broadcast network, or may be downloaded through a broadcast network after channel switching through service linkage.

In the embodiment of FIG. 23, service ID of the added service may be 3, a major channel number may be 10, and a minor channel number may be 10.

FIG. 24 is a view illustrating a method for signaling service linkage information according to the embodiment of the present invention.

As shown in FIG. 24, service linkage information may be added to a PrivateExt element of USBD. The broadcast station may transmit service linkage information to the receiver by adding service linkage information and updating USBD.

In the embodiment of FIG. 24, a value of a linkage type attribute is '3', and the receiver may recognize that the corresponding service is a vehicle service. The receiver may check that an effective time window of this service is from 10:00, Nov. 11, 2016 to 12:00, Nov. 11, 2016, from the service linkage information of USBD. If the user selects the popup "New Firmware Available", since service ID within the service linkage element is "1003", the receiver may perform channel switching by discovering service information of which service Id is 1003 based on the updated SLT. In this case, the broadcast receiver which has received the service linkage information may use an application program interface (API), which can be provided in the vehicle system, to check that the system in which the broadcast receiver is built is a vehicle system. Using this API, it is noted that the system in which the broadcast receiver is built is a vehicle system. Therefore, the current channel may be switched to a channel for FW update by using a notification for a user, such as popup. After channel switching, the broadcast receiver may execute an app for FW update through app signaling and perform FW update by using FW data already downloaded from a previous channel or FW data received after channel switching.

The service linkage may be effective until the deactivation time included in the service linkage information. The receiver may automatically return to the previous channel after the deactivation time. Also, if the receiver switches to another channel before receiving service linkage signaling, firmware update cannot be executed. If the receiver again switches to a channel having service linkage signaling, the receiver may receive service linkage signaling if it does not reach the deactivation time.

The broadcast station may delete the service used for service linkage through SLT update after the deactivation time passes. The broadcast station may delete the service described by the SLT after the deactivation time, and may perform SLT update signaling. In this way, the broadcast station transmits FW data for FW update through a broadcast network but provide a FW update dedicated service through service linkage in a specific channel for a specific time only.

Figure 25:
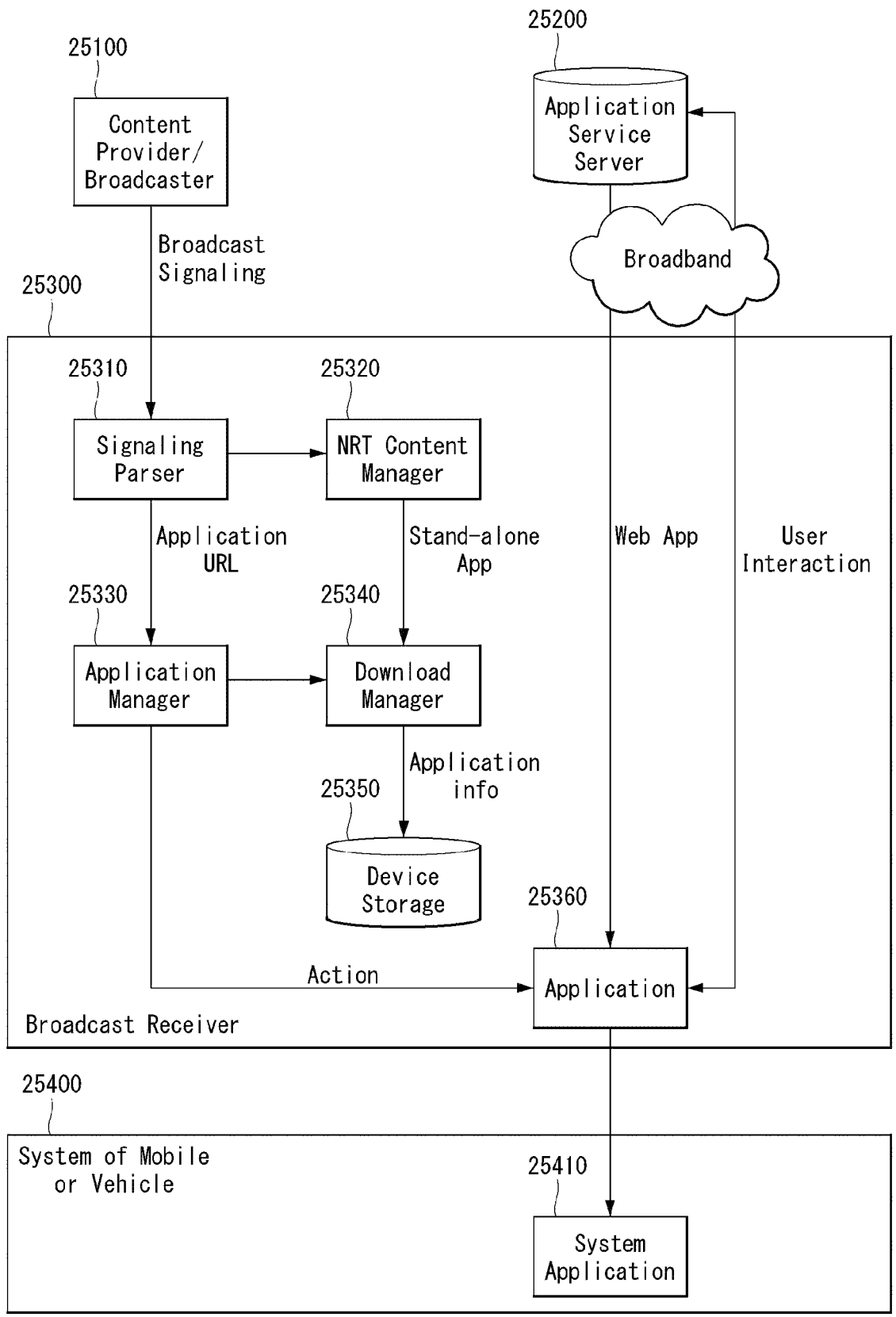
FIG. 25 is a view illustrating a broadcast system for providing a data casting service according to the embodiment of the present invention.

FIG. 25 is a view illustrating a broadcast system for providing a data casting service according to the embodiment of the present invention.

The broadcast system includes a content provider/broadcast station 25100, an application service server 25200, a broadcast receiver 25300, and a vehicle or mobile system 25400. The broadcast receiver 25300 may be an ATSC3.0 receiver for receiving and processing an ATSC3.0 signal.

The content provider/broadcast station 25100 may transmit signaling information through a broadcast signal.

The application service server 25200 is an application server provided by the content provider or the broadcast station. The application service server 25200 may transmit application data through broadband/Internet.

The broadcast receiver 25300 may include a signaling parser 25310, an NRT content manager 25320, an application manager 25330, a download manager 25340, a device storage 25350, and an application 25360. The blocks included in the broadcast receiver 25300 may correspond to software driven by a broadcast reception processor.

The signaling parser 25310 parses signaling information included in the broadcast signal transmitted from the content provider/broadcast station. The NRT content manager manages a non-real time content. The application manager 25330 parses the broadcast signal, and manages a corresponding application if the broadcast signal includes application related signaling. The download manager 25340 manages NRT content or download of application related information from a server provided by the broadcast station or the content provider. The device storage 25350 may be an inner unit of the broadcast receiver, such as a memory that stores data. The application 25360 corresponds to an application provided by the content provider/broadcast station. The application 25360 may correspond to a web application or a standalone application. The web application means an application executed based on Internet. The standalone application means an application which is stored in a storage and executed. The application manager 25330 may control the application 25360 by using a signal Action for controlling driving of the application. The driving control signal Action may indicate an operation control such as activate/launch, suspend, resume and terminate/exit of the application.

The system application 25410 indicates an application that can perform a task such as firmware update within the vehicle or mobile system.

The receiver may process app-based service, that is, firmware update data received by the application to process the mobile/vehicle service data transmitted from the broadcast station.

FIG. 26 is a view illustrating a method for providing a data casting service according to the embodiment of the present invention.

FIG. 26 is a view illustrating a method for providing a data casting service in the broadcast system of FIG. 25. The description of FIG. 25 is applied to the content provider/broadcast station, the broadcast receiver and its signaling parser and application, and a mobile/vehicle system and its system application in FIG. 26, and the same description will be omitted.

In step S26010, the content provider/broadcast station may transmit service linkage information. The broadcast receiver connected to a channel A may receive service linkage signaling information to the channel A. The method for transmitting service linkage signaling information has been described with reference to FIGS. 20 to 24.

In step S26020, the broadcast receiver may check a type of a system in which the broadcast receiver is built, by using an application program interface (API) provided by the vehicle system or the mobile system. As an embodiment, the broadcast receiver may check the type of the system by using a language such as getDeviceInfo( ).

In step S26030, the broadcast receiver may perform channel switching from channel A to channel B. The broadcast receiver may check that the service linkage information indicates transmission of vehicle data, and the system provided with the receiver may be identified as a vehicle system. In this case, the broadcast receiver may notify the user of the presence of the corresponding vehicle service such as firmware update by using a popup message and a voice message. If the user selects the corresponding service, the broadcast receiver may switch the channel to the channel B that provides the corresponding service.

In step S26040, the broadcast receiver may receive app signaling information for driving of a vehicle dedicated app through the channel B.

In step S26050, the broadcast receiver may operate an application based on app signaling. The application may correspond to a web-application or stand-along application.

In step S26060, the application of the broadcast receiver may execute a firmware update application of the vehicles system.

In step S26070, the vehicle system may perform firmware update based on a preset logic or standard.

Hereinafter, a method for checking a system in which a broadcast receiver is built will be described.

A mobile device or vehicle infotainment system provided with a broadcast receiver may provide API and property. API and property may generally be used in the broadcast receiver or ATSC3.0 receiver. API and property may be defined in a run time environment or native system level of the broadcast system, or may be defined by extending the extending API and property.

As an embodiment, the broadcast receiver may use API as follows.

DeviceInfo, getDeviceInfo( ) information of a device in which a broadcast receiver or ATSC3.0 receiver is built returns.

The broadcast receiver may page getDeviceInfo( ) API to check a type of a device in which the system of the broadcast receiver is currently operated. The broadcast receiver may receive extended Deviceinfo class information for the return of getDeviceInfo( ).

As another embodiment, the broadcast receiver may use the following API.

Boolean, LaunchSystemApplication( ) executes a system application of a mobile device or vehicle in which the broadcast receiver or ATSC3.0 receiver is built.

The broadcast receiver may page LaunchSystemApplication( ) API to execute an application of a mobile system or vehicle system connected with the receiver. The executed system application may perform an operation such as firmware update.

As described above, the broadcast receiver may receive the extended Deviceinfo class information by return of getDeviceInfo( ).

The extended Deviceinfo class information may include ID which is a unique integer. ID of the extended Deviceinfo Class information may be an implementation dependent identifier for a device defined by a local system. The system may ensure that id allocated to a device is not changed for a life of the application. As an embodiment, integer ID indicating a device type may be defined as follows. That is, a device type value for at least one of a fixed device, a mobile device and a vehicle device may be added as follows. An embodiment according to a device type indicated by an integer value of the device type information is as follows.

0: audio capture device
1: video capture device
2: fixed device
3: mobile device
4: car/vehicle device If the broadcast receiver pages getDeviceinfo API, the system may return the device type value. Therefore, the broadcast receiver may check a type of a device in which the broadcast receiver is built.

The extended Deviceinfo Class information may include string deviceName. The device name information deviceName may be a name friendly for the device. The device name information may be used in a user message.

The extended Deviceinfo Class information may include string deviceProductName. Device product name information may provide information such as a complete name and a model number for the device.

FIG. 27 is a view illustrating data casting information of SLT according to the embodiment of the present invention.

As an embodiment, a data casting element may be added to a service element of the SLT. The data casting element includes data casting information, and attributes included in the data casting information and their description are as follows. The data casting element may include at least one of sub attributes shown in FIG. 27, and does not need to include all sub attributes.

@manufacturer: manufacture attribute provides manufacturer information of a target device. The receiver may filter a target service based on manufacturer information. The target service indicates the data casting service.

@model: model attribute provides a mode name/number of the target device. The receiver may filter the target service based on model information.

@version: version attribute indicates a version of software/firmware. The receiver may filter the target service based on version information.

@priority: priority attribute indicates a priority for application of a target service, that is, data casting service. For example, if a value of the priority attribute is 0, it may indicate forcible update, if the value of the priority attribute is 1, it may indicate update after user consent, and if a value of the priority attribute is 2, it may indicate cancellable update.

@url: URL attribute indicates URL information that can download service data through broadband.

@usageReportURL: usage report URL attribute indicates URL information for transmitting a report for service provision, such as a software application result.

Firmware/software update of the broadcast receiver that receives the SLT of FIG. 27 may be performed as follows.

A manufacturer server may provide the broadcast station with information for firmware update, such as firmware, manufacturer information, and update execution application. The broadcast station may configure signaling information and update data by receiving update information. The broadcast station may configure an app-based channel for providing software update by using service linkage information of USBD. The broadcast station may transmit SLT that includes data casting information.

The broadcast receiver may parse data casting information from the received SLT. The broadcast receiver may determine whether the data casting service is required for the device in which the broadcast receiver is built, by using manufacturer information, model information, version information, etc. included in the data casting information. The broadcast receiver may filter the data casting service if a target device/software does not correspond to the data casting service. The broadcast receiver may determine whether to apply a service for the corresponding receiver, by using manufacturer information or model information. The broadcast receiver may determine whether update is required, by comparing version information with a software version of the current receiver.

If the data casting service is software update of the external device connected with the broadcast receiver, the broadcast receiver may receive data for updated. The broadcast receiver may notify the user whether software update is available, by using service linkage information. If the user selects software update, the broadcast receiver may perform channel switching to an app-based channel delivered through service linkage information. The broadcast receiver may execute an application which will be updated. The broadcast receiver may immediately perform update in accordance with a priority included in the data casting information or perform update after user selection. The broadcast receiver may download data by accessing URL of data casting information if connected to a communication network such as broadband and Internet. The broadcast receiver may report the result of update.

Figure 28:
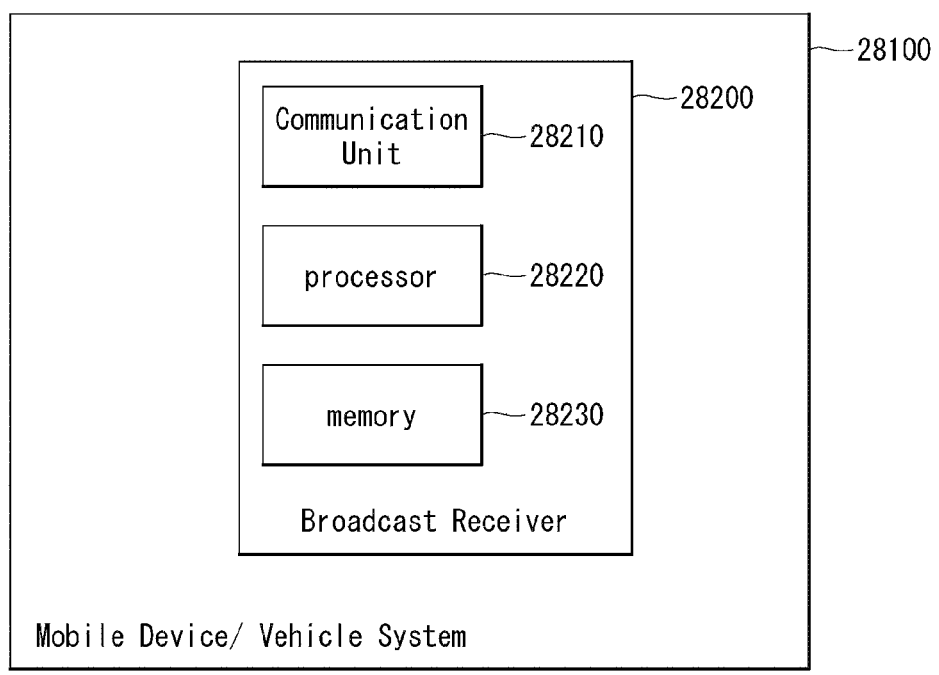
FIG. 28 is a block view illustrating a broadcast receiver according to one embodiment of the present invention.

FIG. 28 is a block view illustrating a broadcast signal reception device according to one embodiment of the present invention.

In FIG. 28, the broadcast signal reception device 28200 may be included in a mobile device 28100 or a vehicle system 28100. As an embodiment, the vehicle system 28100 may correspond to an on-board unit or infotainment system included in a vehicle. Hereinafter, the broadcast signal reception device will be described as an example of the vehicle system 28100.

The broadcast signal reception device 28200 may include a communication unit 28210, a processor 28220, and a memory 28230. As described above, the broadcast signal reception device may be an ATSC3.0 broadcast signal reception device that can process ATSC3.0 signal.

The communication unit 28210 may be connected with the processor 28220 to transmit/receive a radio signal. The communication unit 28210 may transmit a signal by performing upconverting data received from the processor 28220 to a transmission and reception band.

The processor 28220 may be connected with the communication unit 28210 to implement a physical layer and/or link layer technology according to the ATSC 3.0 system. The processor 28220 may be configured to perform the operation according to various embodiments of the present invention based on the aforementioned drawings and description. Also, a module for implementing the operation of the broadcast signal reception device 28200 according to the aforementioned various embodiments of the present invention may be stored in the memory 28230 and executed by the processor 28220.

The memory 28230 is connected with the processor 28220 and stores various kinds of information for driving the processor 28220. The memory 28230 may be included inside or outside the processor 28220 and connected with the processor 28220 by a known means. A detailed configuration of the broadcast signal reception device 28200 may be implemented in such a manner that the aforementioned various embodiments of the present invention may independently be applied to the broadcast signal reception device 28200 or two or more embodiments may simultaneously be applied to the broadcast signal reception device 28200.

As an embodiment, the broadcast signal reception device of FIG. 25 may be applied to the broadcast signal reception device 28200 of FIG. 28. In this case, a device storage may correspond to the memory 28230. Also, the logical blocks such as the signaling parser, the application manager, the NRT content manager, the download manager, and the application may be stored in the memory 28230 and perform the operation of software executed by the processor 28220.

The broadcast signal reception device 28200 may be provided as a part of the external device not a separate device. That is, in the present invention, the broadcast signal reception device 28200 may be included in the external device 28100 such as the mobile device or the vehicle system.

Figure 29:
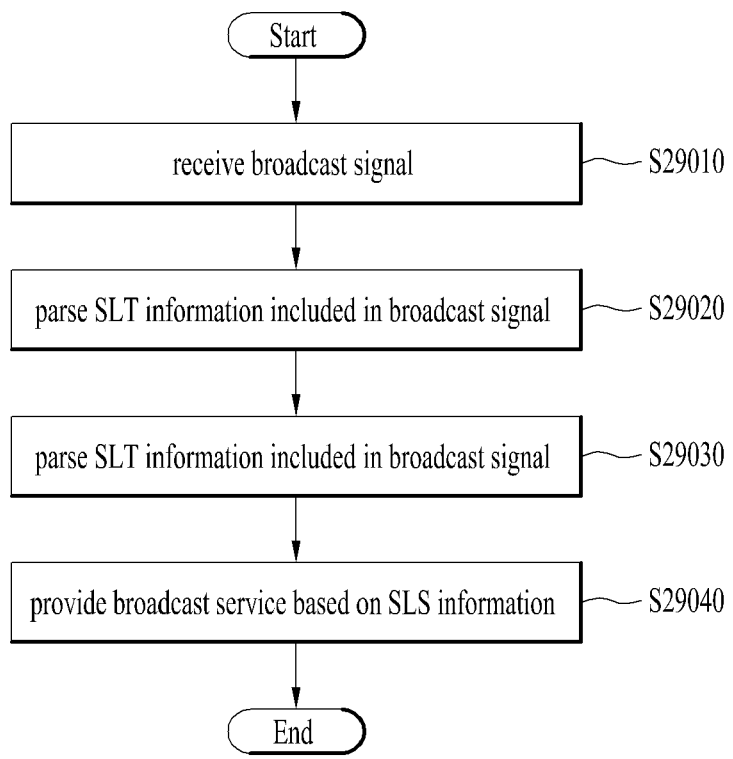
FIG. 29 is a view illustrating a broadcast signal reception method according to the embodiment of the present invention.

FIG. 29 is a view illustrating a broadcast signal reception method according to the embodiment of the present invention.

The broadcast signal reception method of FIG. 29 may be performed by the broadcast signal reception device of FIG. 28.

The broadcast signal reception device may receive a first broadcast signal through a first channel (29010). The broadcast signal includes SLT information and SLS information as described in FIGS. 1 to 5.

The broadcast signal reception device may parse SLT information included in the first broadcast signal (S29020). The broadcast signal reception device may receive SLS information based on the parsed SLT and parse the received SLS information (S29030). The broadcast signal reception device may provide a broadcast service based on SLS information (S29040). The broadcast signal reception device may provide the broadcast service by receiving and decoding in a corresponding protocol based on the SLS information.

The broadcast signal reception device may provide a data casting service based on service linkage information as described in FIGS. 6 to 27 if the SLS information includes the service linkage information. The service linkage information may indicate data casting for firmware update of the external device connected with the broadcast signal reception apparatus.

The data casting service of the broadcast signal reception device may be provided by including the following steps.

The broadcast signal reception device may determine whether the external device is a target device of the data casting service. The broadcast signal reception device may determine whether to apply the data casting service by using the aforementioned service category information or linkage type information of the service linkage information. The broadcast signal reception device may notify the user of availability of the data casting service through a popup or voice message. The broadcast signal reception device may perform channel switching to a channel, to which the data casting service is provided, based on broadcast stream ID information included in the broadcast signal. The broadcast stream ID information may be included in the service linkage information to indicate a channel to which the data casting service is provided, as described in FIG. 20. Alternatively, broadcast stream ID included in the SLT may be used. The broadcast signal reception device may perform firmware update based on a second broadcast signal received from a second channel.

Firmware update of the broadcast signal reception device may be performed by including the following steps.

The broadcast signal reception device may acquire data casting information included in the SLS information or the SLT information included in the broadcast signal received from the switched channel. The data casting information includes information required to perform firmware update as shown in FIG. 27. The broadcast signal reception device may determine whether to apply firmware update, based on the data casting information. That is, the broadcast signal reception device may determine whether the external device connected therewith is a target device of firmware update or an application of the external device is a target application of firmware update, based on manufacturer information, model information, version information, etc. If firmware update is applied to the broadcast signal reception device, the broadcast signal reception device may request the external device to perform firmware update by using update data.

As described in FIG. 8, the service category information of the SLT information includes the data casting service for a mobile device or vehicle. As described in FIGS. 9 to 11, S-TSID information of the SLT information or the SLS information includes data casting identification information indicating whether the service described by S-TSID is a data casting service.

The steps described in the above-described embodiments can be performed by hardware/processors. The modules/blocks/units described in the above-described embodiments can operate as hardware/processors. In addition, the methods proposed by the present invention can be executed as code. Such code can be written on a processor-readable storage medium and thus can be read by a processor provided by an apparatus.

While the present invention has been described with reference to separate drawings for the convenience of description, new embodiments may be implemented by combining embodiments illustrated in the respective drawings. The device and method according to the present invention is not limitedly applied to the configurations and methods of the embodiments as previously described; rather, all or some of the embodiments may be selectively combined to achieve various modifications.

In addition, it will be apparent that, although the preferred embodiments have been shown and described above, the present specification is not limited to the above-described specific embodiments, and various modifications and variations can be made by those skilled in the art to which the present invention pertains without departing from the gist of the appended claims. Thus, it is intended that the modifications and variations should not be understood independently of the technical spirit or prospect of the present specification.

Those skilled in the art will appreciate that the present invention may be carried out in other specific ways than those set forth herein without departing from the spirit and essential characteristics of the present invention. Therefore, the scope of the invention should be determined by the appended claims and their legal equivalents, rather than by the above description, and all changes that fall within the meaning and equivalency range of the appended claims are intended to be embraced therein.

In addition, the present specification describes both a product invention and a method invention, and descriptions of the two inventions may be complementarily applied as needed.

Mode for Implementing the Invention

Various embodiments have been described in the best mode for implementing the present invention.

INDUSTRIAL APPLICABILITY

The present invention is used in the field for a series of broadcast signals.

It will be apparent to those skilled in the art that various modifications and variations can be made in the present invention without departing from the spirit and essential characteristics of the present invention. Therefore, the scope of the invention should be determined by the appended claims and their legal equivalents, rather than by the above description, and all changes that fall within the meaning and equivalency range of the appended claims are intended to be embraced therein.

The invention claimed is:

1. A method of processing data delivered via a broadcast path or a broadband path in a digital receiver, the method comprising:
   receiving a broadcast signal;
   parsing a service list table (SLT) included in the broadcast signal, wherein the SLT is used to provide bootstrap information that allows the digital receiver to discover Service Layer Signaling (SLS) for a service,
   wherein the bootstrap information includes a destination IP address and a destination port of a Layered Coding Transport (LCT) channel that carries a ROUTE-specific SLS for ROUTE-delivered services while the bootstrap information includes a destination IP address and destination port of a MPEG Media Transport Protocol (MMTP) session carrying a MMTP-specific SLS for MMTP-delivered services,
   wherein the SLT comprises base URL to acquire Electronic Service Guide (ESG) or service layer signaling files available via broadband for the service in the SLT, service ID information, hidden information for representing that the service is intended for testing or proprietary use, and service category information,
   wherein the service category information identifies a linear A/V service, a linear audio only service, an app-based service, an ESG service or an Emergency Alert System (EAS) service;
   obtaining the SLS from the SLT; and
   providing the service based on the SLS.

2. The method of claim 1, further comprising:
   receiving GPS information; and displaying a first message for representing that a specific coupon is available based on the received GPS information.

3. The method of claim 2, further comprising:
displaying a second message for representing that new firmware is available based on metadata, wherein the metadata includes priority information.

4. The method of claim 3, wherein the digital receiver updates based on new firmware automatically when the priority information has a first value.

5. The method of claim 4, wherein the digital receiver updates based on new firmware with a user's confirmation when the priority information has a second value different from the first value.

6. The method of claim 1, wherein first data related to the service is received via the broadcast path while second data related to the service is received via the broadband path.

7. The method of claim 6, wherein the first data has a first size while the second data has a second size smaller than the first size.

8. The method of claim 1, wherein the digital receiver corresponds to a television, a mobile device or a vehicle.

9. The method of claim 8, wherein video data included in the service is displayed in a glass of the vehicle when the digital receiver corresponds to the vehicle.

10. A digital receiver of processing data delivered via a broadcast path or a broadband path, the digital receiver comprising:
a tuner configured to receive a broadcast signal;
a processor configured to parse a service list table (SLT) included in the broadcast signal,
wherein the SLT is used to provide bootstrap information that allows the digital receiver to discover Service Layer Signaling (SLS) for a service,
wherein the bootstrap information includes a destination IP address and a destination port of a Layered Coding Transport (LCT) channel that carries a ROUTE-specific SLS for ROUTE-delivered services while the bootstrap information includes a destination IP address and destination port of a MPEG Media Transport Protocol (MMTP) session carrying a MMTP-specific SLS for MMTP-delivered services,
wherein the SLT comprises base URL to acquire Electronic Service Guide (ESG) or service layer signaling files available via broadband for the service in the SLT, service ID information, hidden information for representing that the service is intended for testing or proprietary use, and service category information,
wherein the service category information identifies a linear AN service, a linear audio only service, an app-based service, an ESG service or an Emergency Alert System (EAS) service;
wherein the processor is further configured to obtain the SLS from the SLT; and
a display configured to provide the service based on the SLS.

11. The digital receiver of claim 10, wherein the digital receiver further comprises a GPS module configured to receive GPS information, and the display further configured to display a first message for representing that a specific coupon is available based on the received GPS information.

12. The digital receiver of claim 11, wherein the display is further configured to display a second message for representing that new firmware is available based on metadata, wherein the metadata includes priority information.

13. The digital receiver of claim 12, wherein the digital receiver updates based on new firmware automatically when the priority information has a first value.

14. The digital receiver of claim 13, wherein the digital receiver updates based on new firmware with a user's confirmation when the priority information has a second value different from the first value.

15. The digital receiver of claim 10, wherein first data related to the service is received via the broadcast path while second data related to the service is received via the broadband path.

16. The digital receiver of claim 15, wherein the first data has a first size while the second data has a second size smaller than the first size.

17. The digital receiver of claim 10, wherein the digital receiver corresponds to a television, a mobile device or a vehicle.

18. The digital receiver of claim 17, wherein video data included in the service is displayed in a glass of the vehicle, when the digital receiver corresponds to the vehicle.

* * * * *